United States Patent                    (10) Patent No.:     US 7,355,772 B2
Kato                                        (45) Date of Patent:         Apr. 8, 2008

(54) SCANNER AND IMAGE FORMING APPARATUS INCLUDING A PRE-DEFLECTION LENS THAT HAS A WIDTH REDUCED BY AN EMISSION-SIDE CONCAVITY AND THAT CONVERGES LIGHT INCIDENT ON AREAS OTHER THAN THE THINNED PORTION

(75) Inventor: Ryota Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/764,155

(22) Filed: Jun. 15, 2007

(65) Prior Publication Data
US 2007/0242333 A1    Oct. 18, 2007

Related U.S. Application Data

(62) Division of application No. 11/313,084, filed on Dec. 21, 2005.

(30) Foreign Application Priority Data
Dec. 24, 2004   (JP)   ............................ 2004-374372

(51) Int. Cl.
    G02B 26/08    (2006.01)
(52) U.S. Cl. ...................................... 359/206; 359/662
(58) Field of Classification Search ........ 359/204–207, 359/662, 668–671, 717–718, 737, 741, 743; 347/258–259; 351/200–247
    See application file for complete search history.

(56) References Cited

U.S. PATENT DOCUMENTS

| 2,405,989 | A | * | 8/1946 | Beach ........................ 351/169 |
| 5,737,300 | A | | 4/1998 | Ota et al. |
| 5,745,285 | A | * | 4/1998 | Harder et al. ............... 359/356 |
| 5,838,431 | A | | 11/1998 | Hara et al. |
| 6,731,417 | B2 | | 5/2004 | Iizuka |
| 6,819,461 | B2 | | 11/2004 | Makino |
| 2004/0047018 | A1 | * | 3/2004 | Takakubo ................... 359/204 |
| 2004/0169905 | A1 | | 9/2004 | Hayashi et al. |
| 2005/0030646 | A1 | * | 2/2005 | Braun ........................ 359/796 |

FOREIGN PATENT DOCUMENTS

| JP | H05-066354 A | 3/1993 |
| JP | H05-047084 B2 | 7/1993 |
| JP | 2003-222812 A | 8/2003 |
| JP | 2003-322821 A | 11/2003 |

* cited by examiner

Primary Examiner—Thong Nguyen
Assistant Examiner—Jennifer L Doak
(74) Attorney, Agent, or Firm—Baker Botts L.L.P.

(57) ABSTRACT

A cylindrical lens is positioned between and a polygon mirror and a second slit plate through which light beams from two light beam emitting units pass, and the cylindrical lens has a thin portion where the thickness between the entrance plane and the emission plane is reduced by forming the cylindrical lens in a shape created by cutting off a surface top part of the entrance plane having a convex cross section. The light beams passed through the second slit plate pass through light converging portions provided on both sides of the thin portion of the cylindrical lens in a sub-scanning direction, and are converged on a focal point on a deflecting plane of the polygon mirror.

11 Claims, 7 Drawing Sheets

SCANNER AND IMAGE FORMING APPARATUS INCLUDING A PRE-DEFLECTION LENS THAT HAS A WIDTH REDUCED BY AN EMISSION-SIDE CONCAVITY AND THAT CONVERGES LIGHT INCIDENT ON AREAS OTHER THAN THE THINNED PORTION

CROSS-REFERENCE TO RELATED APPLICATION

This non-provisional application claims priority under 35 U.S.C. §119(a) on Patent Application No. 2004-374372 filed in Japan on Dec. 24, 2004, the entire contents of which are hereby incorporated by reference.

BACKGROUND

The present invention relates to an image forming apparatus, such as a laser printer, and a scanner apparatus incorporated in the image forming apparatus.

An electrophotographic type laser printer incorporates a scanner unit for forming an electrostatic latent image on a photoconductor.

The scanner unit comprises a light beam emitting unit composed of a semiconductor laser, for example, and a polygon mirror for deflecting and scanning a light beam from the light beam emitting unit. The light beam emitted from the light beam emitting unit is deflected by the polygon mirror and scans a uniformly charged photoconductor at high speed to expose the photoconductor to light. Consequently, charges in the exposed portion of the photoconductor are removed, and an electrostatic latent image is formed on the photoconductor by a skewed distribution of charges.

Moreover, in such scanner unit, a cylindrical lens for focusing the light beam from the light beam emitting unit by converging it on one point on the deflecting plane of the polygon mirror is disposed between the light beam emitting unit and the polygon mirror. The cylindrical lens is formed in the shape of a substantially semi-cylindrical shape so that one surface in the light beam passing direction is made a convex surface, the other surface is made a flat surface, and the thickness between the surface top part of the one surface in the shape of a convex surface and the other surface becomes largest (see, for example, Japanese Examined Patent Application Laid-Open No. 5-47084 (1993)).

SUMMARY

From the point of view of cost, a cylindrical lens is often formed by injection molding using a resin material. However, if a cylindrical lens has a shape disclosed in Japanese Examined Patent Application Laid-Open No. 5-47084 (1993), it is necessary to wait until the resin material in the thickest portion is cooled and solidified on injection molding, and consequently a long time is required to manufacture the cylindrical lens (the productivity is poor).

It is therefore an object to provide a scanner apparatus and an image forming apparatus capable of shortening the manufacture time of the lens, and thereby improving the productivity.

In order to achieve the above object, a scanner apparatus according to a first aspect is characterized by comprising: a light beam emitting unit for emitting a light beam; a lens having a thin portion where a thickness between an entrance plane side and an emission plane side is reduced, of a shape lacking a surface top part on the entrance plane side having a convex cross section, for converging a light beam incident on a portion other than the thin portion from the light beam emitting unit on a single focal point after emitted from the emission plane side; and a deflecting unit having a deflecting plane for reflecting and deflecting the light beam from the lens, for scanning the light beam in one scanning direction.

According to such a structure, since the lens has a thin portion, if the lens is formed by injection molding using a resin material, it is possible to reduce the time required for cooling and solidifying the resin material. It is therefore possible to shorten the manufacturing time of the lens. As a result, the productivity of the scanner apparatus can be improved.

A light beam from the light beam emitting unit is incident on a portion of the lens other than the thin portion, and the lens converges and focuses the light beam on the deflecting plane of deflecting means. Thus, even though the lens has the thin portion, it is possible to accurately converge (focus) light beams on the deflecting plane of the deflecting means without causing problems, such as a focal displacement of the light beams with respect to the deflecting plane of the deflecting means.

A scanner apparatus according to a second aspect is characterized by comprising: a light beam emitting unit for emitting a light beam; a lens having a thin portion where a thickness between an entrance plane side and an emission plane side is reduced by a concave unit in a part of the emission plane side facing a surface top part of the entrance plane side having a convex cross section, for converging a light beam incident on a portion other than the thin portion from the light beam emitting unit on a single focal point after emitted from the emission plane side; and a deflecting unit having a deflecting plane for reflecting and deflecting the light beam from the lens, for scanning the light beam in one scanning direction.

According to such a structure, since the lens has a thin portion, if the lens is formed by injection molding using a resin material, it is possible to reduce the time required for cooling and solidifying the resin material. It is therefore possible to shorten the manufacturing time of the lens. As a result, the productivity of the scanner apparatus can be improved.

A light beam from the light beam emitting unit is incident on a portion of the lens other than the thin portion, and the lens converges and focuses the light beam on the deflecting plane of deflecting means. Thus, even though the lens has the thin portion, it is possible to accurately converge (focus) light beams on the deflecting plane of the deflecting means without causing problems, such as a focal displacement of the light beams with respect to the deflecting plane of the deflecting means.

A scanner apparatus according to a third aspect is characterized by comprising: a light beam emitting unit for emitting a light beam; a lens having a light converging portion for converging the light beam from the light beam emitting unit on a single focal point, and a thin portion whose thickness in a passing direction of the light beam when incident on the light converging portion is not larger than a maximum thickness of the light converging portion in the passing direction and whose focal length differs from the light converging portion; and deflecting means having a deflecting plane for reflecting and deflecting the light beam converged by the light converging portion, for scanning the light beam in one scanning direction.

According to such a structure, since the lens has a thin portion, if the lens is formed by injection molding using a resin material, it is possible to reduce the time required for cooling and solidifying the resin material. It is therefore possible to shorten the manufacturing time of the lens. As a result, the productivity of the scanner apparatus can be improved.

A light beam from the light beam emitting unit is incident on the light converging portion of the lens other than the thin portion, and converged and focused on the deflecting plane of the deflecting means. Thus, even though the lens has the thin portion, it is possible to accurately converge (focus) light beams on the deflecting plane of the deflecting means without causing problems, such as a focal displacement of the light beams with respect to the deflecting plane of the deflecting means.

An image forming apparatus according to a fourth aspect is characterized by comprising: a photoconductor; a light beam emitting unit for emitting a light beam to expose the photoconductor to light; a lens having a thin portion where a thickness between an entrance plane side and an emission plane side is reduced, of a shape lacking a surface top part on the entrance plane side having a convex cross section, for converging a light beam incident on a portion other than the thin portion from the light beam emitting unit on a single focal point after emitted from the emission plane side; and a deflecting unit having a deflecting plane for reflecting and deflecting the light beam from the lens, for scanning the light beam in one scanning direction on the photoconductor.

According to such a structure, since the lens has a thin portion, if the lens is formed by injection molding using a resin material, it is possible to reduce the time required for cooling and solidifying the resin material. It is therefore possible to shorten the manufacturing time of the lens. As a result, the productivity of the image forming apparatus can be improved.

A light beam from the light beam emitting unit is incident on a portion of the lens other than the thin portion, and the lens converges and focuses the light beam on the deflecting plane of deflecting means. Thus, even though the lens has the thin portion, it is possible to accurately converge (focus) light beams on the deflecting plane of the deflecting means without causing problems, such as a focal displacement of the light beams with respect to the deflecting plane of the deflecting means.

An image forming apparatus according to a fifth aspect is characterized by comprising: a photoconductor; a light beam emitting unit for emitting a light beam to expose the photoconductor to light; a lens having a thin portion where a thickness between an entrance plane side and an emission plane side is reduced by a concave unit in a part of the emission plane side facing a surface top part of the entrance plane side having a convex cross section, for converging a light beam incident on a portion other than the thin portion from the light beam emitting unit on a single focal point after emitted from the emission plane side; and a deflecting unit having a deflecting plane for reflecting and deflecting the light beam from the lens, for scanning the light beam in one scanning direction on the photoconductor.

According to such a structure, since the lens has a thin portion, if the lens is formed by injection molding using a resin material, it is possible to reduce the time required for cooling and solidifying the resin material. It is therefore possible to shorten the manufacturing time of the lens. As a result, the productivity of the image forming apparatus can be improved.

A light beam from the light beam emitting unit is incident on a portion of the lens other than the thin portion, and the lens converges and focuses the light beam on the deflecting plane of deflecting means. Thus, even though the lens has the thin portion, it is possible to accurately converge (focus) light beams on the deflecting plane of the deflecting means without causing problems, such as a focal displacement of the light beams with respect to the deflecting plane of the deflecting means.

An image forming apparatus according to a sixth aspect is characterized by comprising: a photoconductor; a light beam emitting unit for emitting a light beam to expose the photoconductor to light; a lens having a light converging portion for converging the light beam from the light beam emitting unit on a single focal point, and a thin portion whose thickness in a passing direction of the light beam when incident on the light converging portion is not larger than a maximum thickness of the light converging portion in the passing direction and whose focal length differs from the light converging portion; and deflecting means having a deflecting plane for reflecting and deflecting the light beam converged by the light converging means, for scanning the light beam in one scanning direction on the photoconductor.

According to such a structure, since the lens has a thin portion, if the lens is formed by injection molding using a resin material, it is possible to reduce the time required for cooling and solidifying the resin material. It is therefore possible to shorten the manufacturing time of the lens. As a result, the productivity of the image forming apparatus can be improved.

A light beam from the light beam emitting unit is incident on the light converging portion of the lens other than the thin portion, and converged and focused on the deflecting plane of the deflecting means. Thus, even though the lens has the thin portion, it is possible to accurately converge (focus) light beams on the deflecting plane of the deflecting means without causing problems, such as a focal displacement of the light beams with respect to the deflecting plane of the deflecting means.

The above and further objects and features will more fully be apparent from the following detailed description with accompanying drawings.

DETAILED DESCRIPTION OF THE EXEMPLARY EMBODIMENTS

<Overall Structure of Color Laser Printer>

Figure 1:
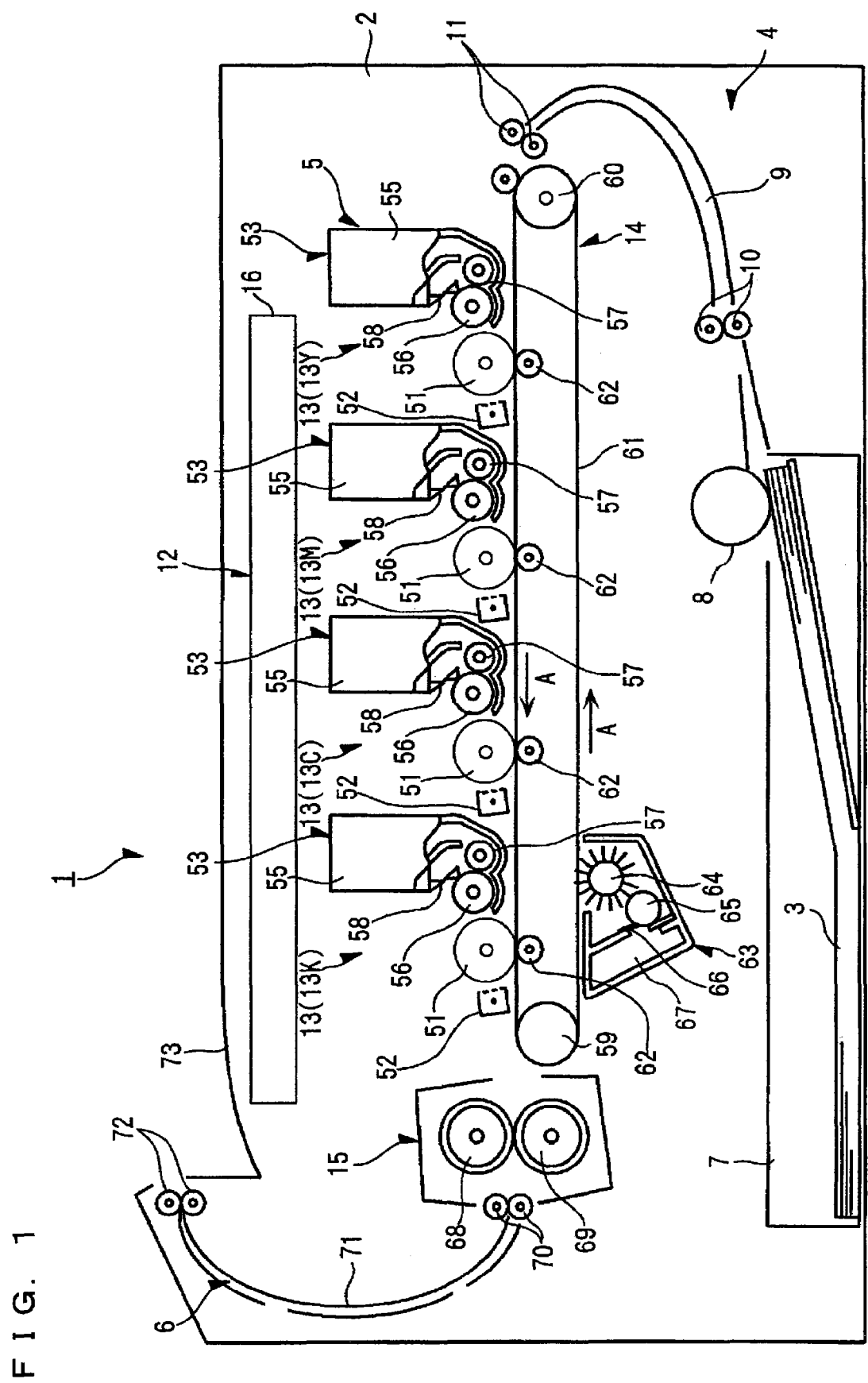
FIG. 1 is a sectional side view showing one embodiment of a color laser printer as an image forming apparatus.

FIG. 1 is a sectional side view showing one embodiment of a color laser printer as an image forming apparatus.

The color laser printer 1 is a transverse-mount-type tandem color laser printer in which a plurality of processing units 13 are aligned in a horizontal direction, and comprises, in a box-shaped main casing 2, a paper feed unit 4 for feeding paper 3, an image forming unit 5 for forming an image on the fed paper 3, and a paper discharge unit 6 for discharging the paper 3 carrying the image formed thereon.

<Structure of Paper Feed Unit>

The paper feed unit 4 comprises a paper cassette 7 placed in the bottom of the main casing 2, a paper feed roller 8 disposed on the upper front side of the paper cassette 7 (in the following explanation, the right side and the left side in FIG. 1 will be referred to as the front side and the rear side, respectively), a paper feed path 9 provided on the upper front side of the paper feed roller 8, a pair of transport rollers 10 disposed in the course of the paper feed path 9, and a pair of resist rollers 11 disposed at the downstream end of the paper feed path 9.

In the paper cassette 7, paper 3 is stacked, and the topmost sheet of the paper 3 is fed to the paper feed path 9 with a rotation of the paper feed roller 8.

The paper feed path 9 is formed as a substantially U-shaped transport path for paper 3 so that the upstream end is located adjacent to the paper feed roller 8 on the lower side to feed the paper 3 toward the front side, and that the downstream end is located adjacent to a later-described transfer belt 61 on the upper side to discharge the paper 3 toward the rear side.

The paper 3 fed to the paper feed path 9 is transported by the transport rollers 10 in the paper feed path 9. After the transport direction of the paper 3 is reversed, the paper 3 is resisted by the resist rollers 11 and then fed toward the rear side by the resist rollers 11.

<Structure of Image Forming Unit>

The image forming unit 5 comprises a scanner unit 12 as a scanner apparatus, processing units 13, a transfer unit 14, and a fixing unit 15.

<Structure of Scanner Unit>

Figure 2:
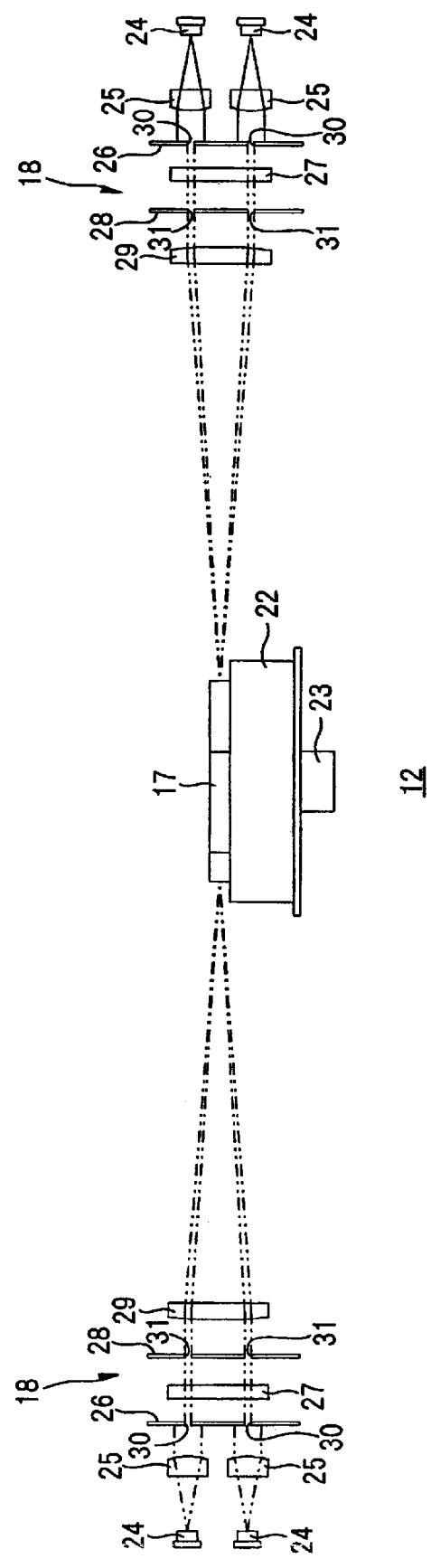
FIG. 2 is a side view showing the optical system of a light beam irradiating optical unit in a scanner unit of the color laser printer shown in FIG. 1.
Figure 6:
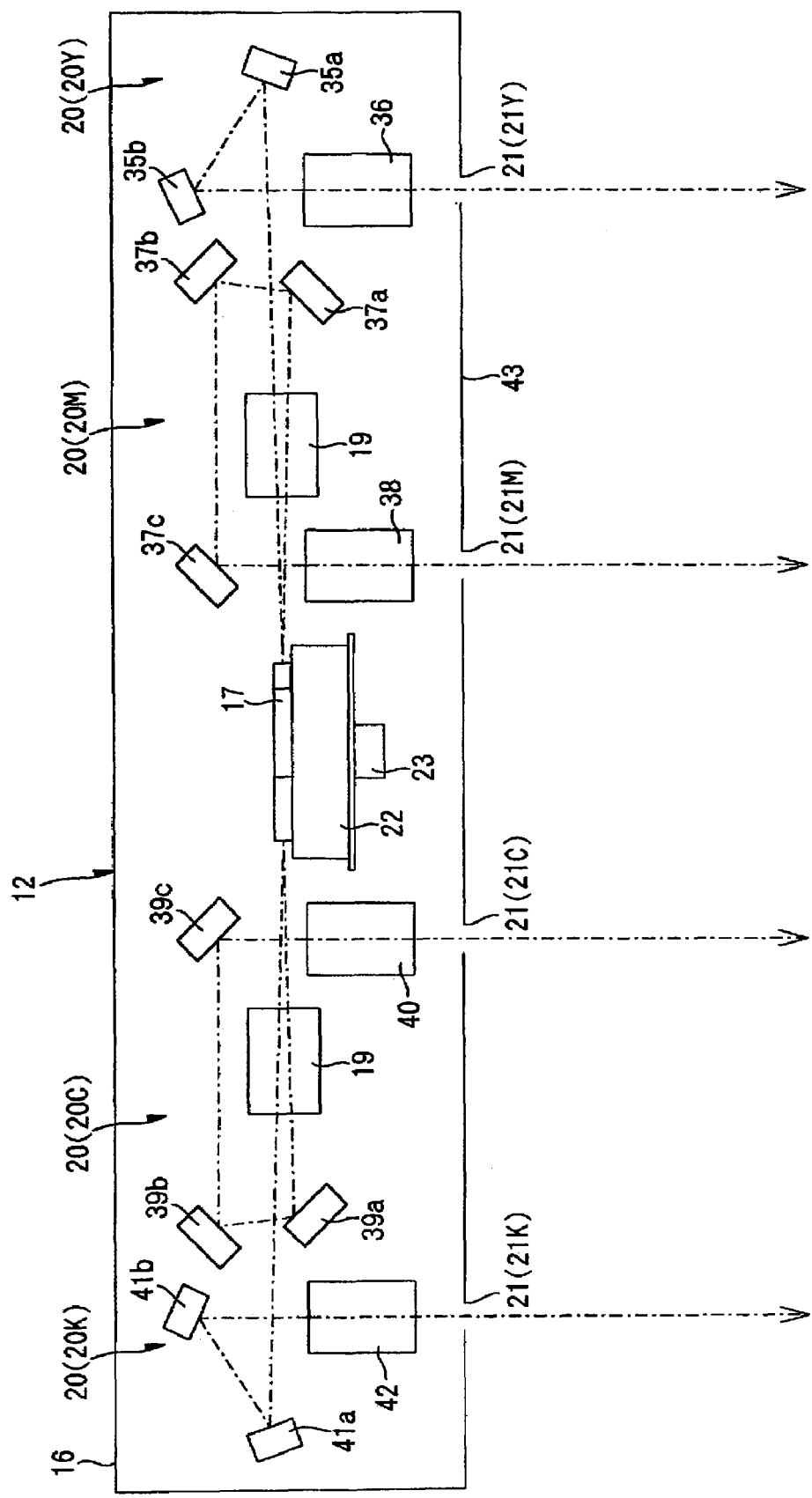
FIG. 6 is a side view of an optical system of the light beam irradiating optical unit in the scanner unit of the color laser printer shown in FIG. 1.

The scanner unit 12 is disposed over a plurality of later-described processing units 13 in the upper part of the main casing 2. FIG. 2 is a side view of an essential structure of the scanner unit 12 seen from a side, and FIG. 6 is a sectional side view of the scanner unit 12 seen from a side. As shown in FIGS. 2 and 6, the scanner unit 12 comprises a scanner casing 16, a polygon mirror 17 mounted as deflecting means in the scanner casing 16, light beam irradiating optical units 18 for irradiating light beams on the polygon mirror 17, fθ lenses 19 for converting the light beams deflected and scanned by the polygon mirrors 17 into parallel light beams of equal speed on an image surface, and light beam emitting optical units 20 as optical path forming means for emitting the light beams passed through the fθ lenses 19 as light beams corresponding to respective colors.

As shown in FIG. 6, the scanner casing 16 is in the shape of a box, and has emission widows 21 corresponding to the respective colors in the bottom wall 43 thereof. The emission windows 21 are formed at different positions in the front-to-rear direction with a space therebetween so that they are formed as a yellow emission window 21Y, a magenta emission window 21M, a cyan emission window 21C and a black emission window 21K corresponding to the respective colors in this order from the front to the rear side.

Figure 3:
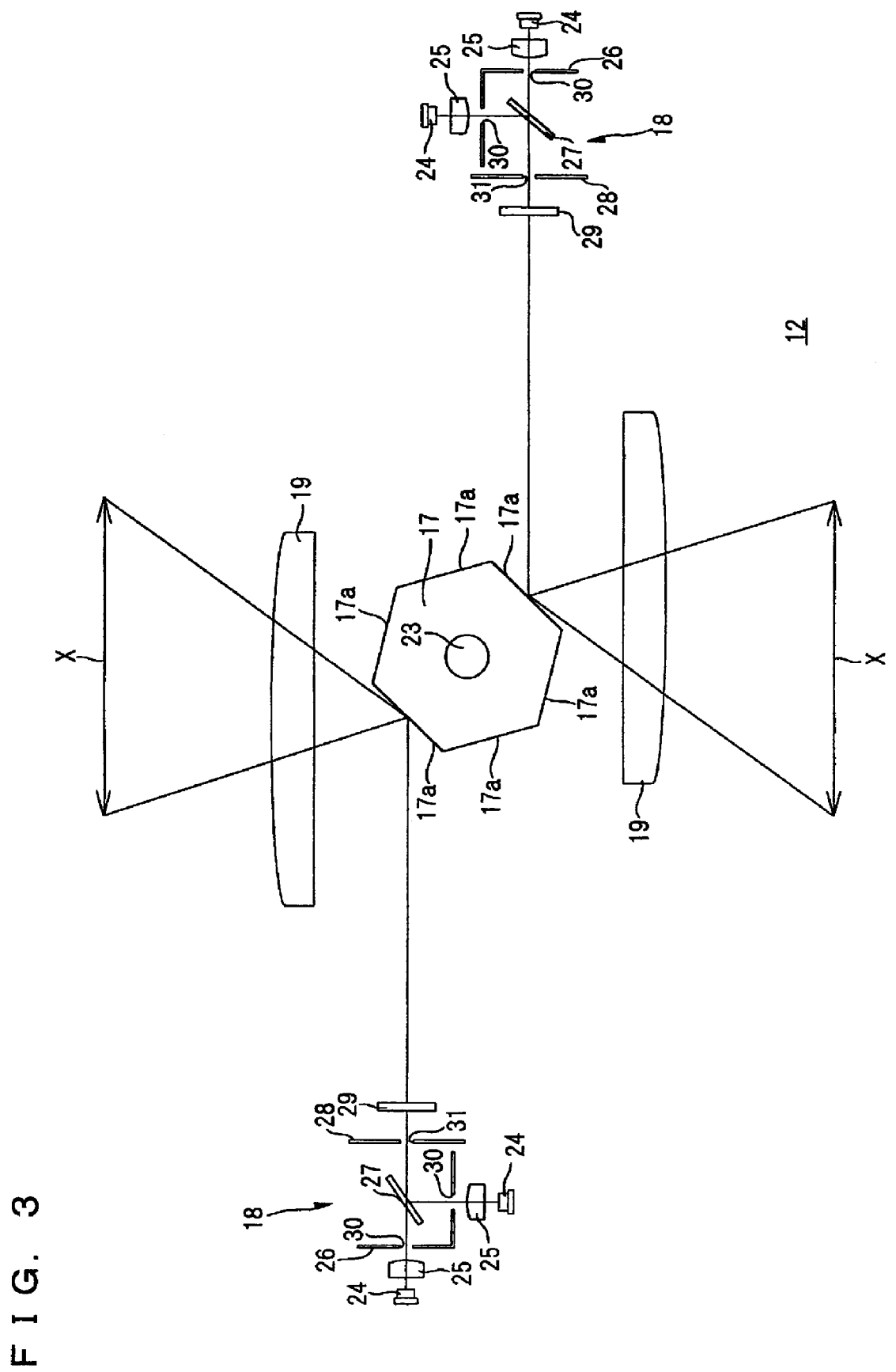
FIG. 3 is a plan view showing the optical system of the light beam irradiating optical unit in the scanner unit of the color laser printer shown in FIG. 1.

One polygon mirror 17 is provided for later-described four light beam emitting units 24 on a motor substrate 22 at the center in the front-to-rear direction in the scanner casing 16. FIG. 3 is a plan view of the essential structure of the scanner unit 12 seen from above. As shown in FIG. 3, the polygon mirror 17 is formed as a polyhedron (for example, a hexahedron) having a plurality of deflecting planes 17a, and is rotated about a rotation axis 23 located in the center thereof at high speed by the power of the scanner motor contained in the motor substrate 22.

The light beam irradiating optical units 18 are disposed symmetrically with respect to the polygon mirror 17. Each of the light beam irradiating optical units 18 comprises one set of light beam emitting units 24, collimator lenses 25, a first slit plate 26, a reflective mirror 27, a second: slit plate 28 as a slit member, and a cylindrical lens 29 as a lens.

The light beam emitting units 24 include semiconductor lasers, and two light beam emitting units 24 are provided in each of the light beam irradiating optical units 18. The light beam emitting units 24 are positioned so that the optical axes of light beams emitted from the respective light beam emitting units 24 cross each other at a right angle. As shown in FIG. 2, the light beam emitting units 24 are positioned in a sub-scanning direction (other scanning direction) Y (see FIG. 4) with a space therebetween.

Figure 4:
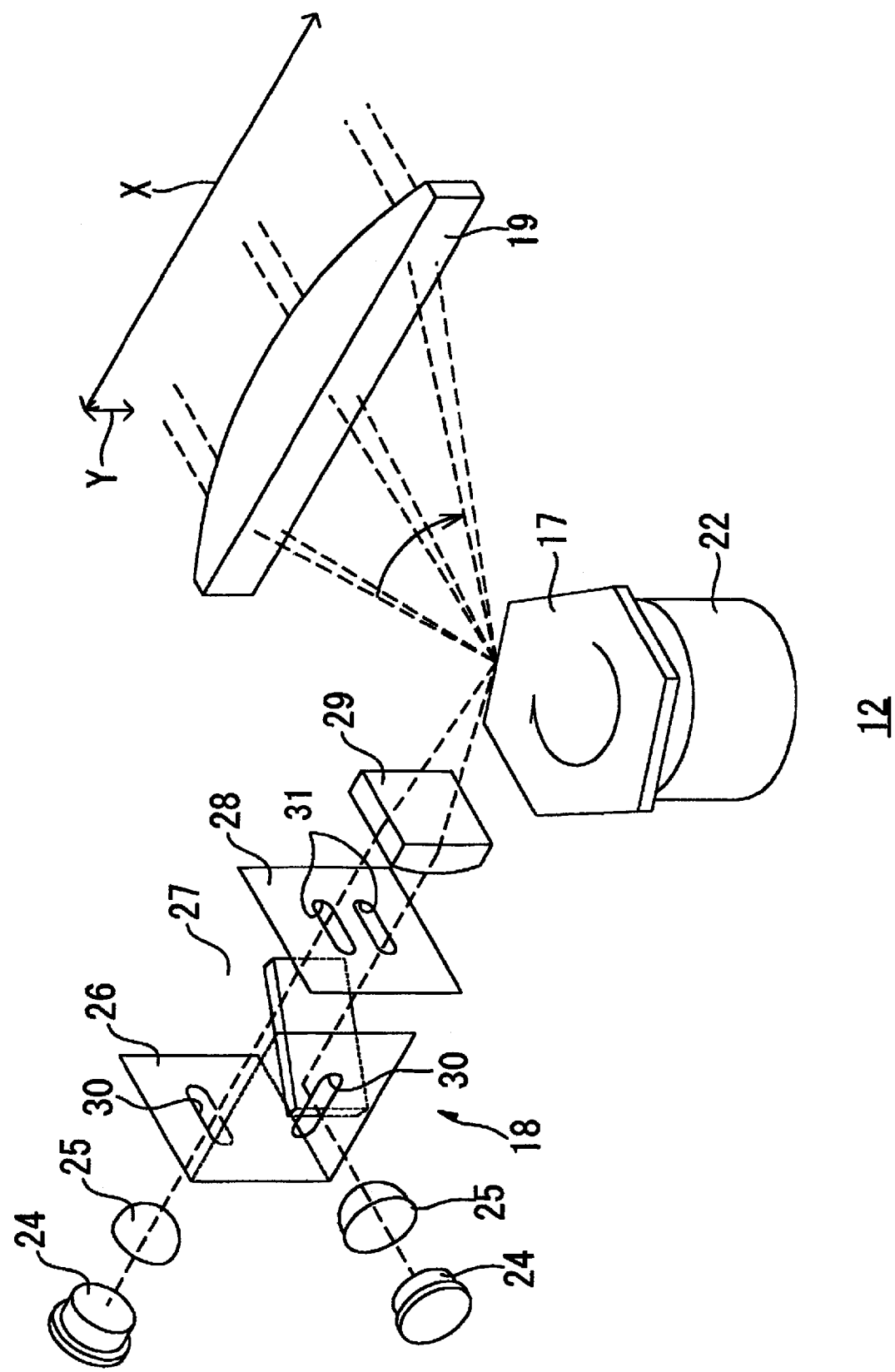
FIG. 4 is a perspective view showing the optical system of the light beam irradiating optical unit in the scanner unit of the color laser printer shown in FIG. 1.

FIG. 4 is a perspective view of the light beam irradiating optical unit 18 in the scanner unit 12 seen obliquely from the front side. As shown in FIG. 4, (two) collimator lenses 25 are provided for the light beam emitting units 24, respectively. Each of the collimator lenses 25 is positioned on the downstream side of each light beam emitting unit 24 to face the light beam emitting unit 24 in a passing direction of the light beam emitted from the light beam emitting unit 24 (hereinafter simply referred to as the light beam passing direction).

The light beams emitted from the light beam emitting units 24 are converted by the respective collimator lenses 25 into parallel light beams in a main scanning direction (one scanning direction) X (see FIG. 4) and the sub-scanning direction Y (see FIG. 4).

As shown in FIG. 3, the first slit plate 26 is made of a substantially L-shaped plate composed of two flat plates connected together at a substantially right angle, and, as shown in FIG. 4, a first slit 30 is open in each of the flat plates. Each of the first slits 30 is formed in the shape of a long hole extending in the main scanning direction X (see FIG. 4), and arranged corresponding to each of the light beam emitting units 24 with a space therebetween. Further, in the first slit plate 26, each of the first slits 30 is arranged on the downstream side of each of the collimator lenses 25 in the light beam passing direction to face the collimator lens 25.

Each light beam that has passed through each of the collimator lenses 25 is restricted in the cross section orthogonal to the light beam passing direction by each first slit 30 of the first slit plate 26, thereby preventing stray light of the light beam emitted from each of the light beam emitting units 24.

The reflective mirror 27 is disposed on the downstream side of the respective first slits 30 in the light beam passing direction, and inclined at substantially 45° with respect to the respective flat plates of the substantially L-shaped first slit plate 26. The reflective mirror 27 is formed so that the light beam passed through one of the slits 30 linearly passes through the upper side as it is, while the light beam passed through the other slit 30 is reflected at substantially 90° and deflected at a substantially right angle on the lower side. Consequently, the optical paths of the two light beams emitted in the directions crossing each other at a right angle from the two light beam emitting units 24 are combined together in the main scanning direction X (see FIG. 4).

The second slit plate 28 is disposed on the downstream side of the reflective mirror 27 in the light beam passing direction. The second slit plate 28 is composed of a substantially rectangular flat plate, and second slits 31 are open corresponding to later-described light converging portions 33 of the cylindrical lens 29. The second slits 31 are formed in the shape of a long hole extending in the main scanning direction X (see FIG. 4), and aligned with a space therebetween in the sub-scanning direction Y (see FIG. 4) at an interval corresponding to the respective light beam emitting units 24.

The respective light beams passed through or reflected by the reflective mirror 27 pass through the respective second slits 31 of the second slit plates 28 and travel in parallel with each other in the sub-scanning direction Y. It is thus possible to prevent the incidence of light beams on a later-described thin portion 32 of the cylindrical lens 29.

The cylindrical lens 29 is a resin lens formed by injection molding using a resin material, and disposed to face the second slit plate 28 with a predetermined distance therebetween at a position on the downstream side of the second slit plate 28 and the upstream side of the polygon mirror 17 in the light beam passing direction. In the cylindrical lens 29, as shown in FIG. 4, a plane facing the second slit plate 28 is an entrance plane 29a on which the light beams passed through the second slit plate 28 are incident, and a plane facing the polygon mirror 17 is a flat emission plane 29b for emitting the light beams incident from the entrance plane 29a.

Figure 5:
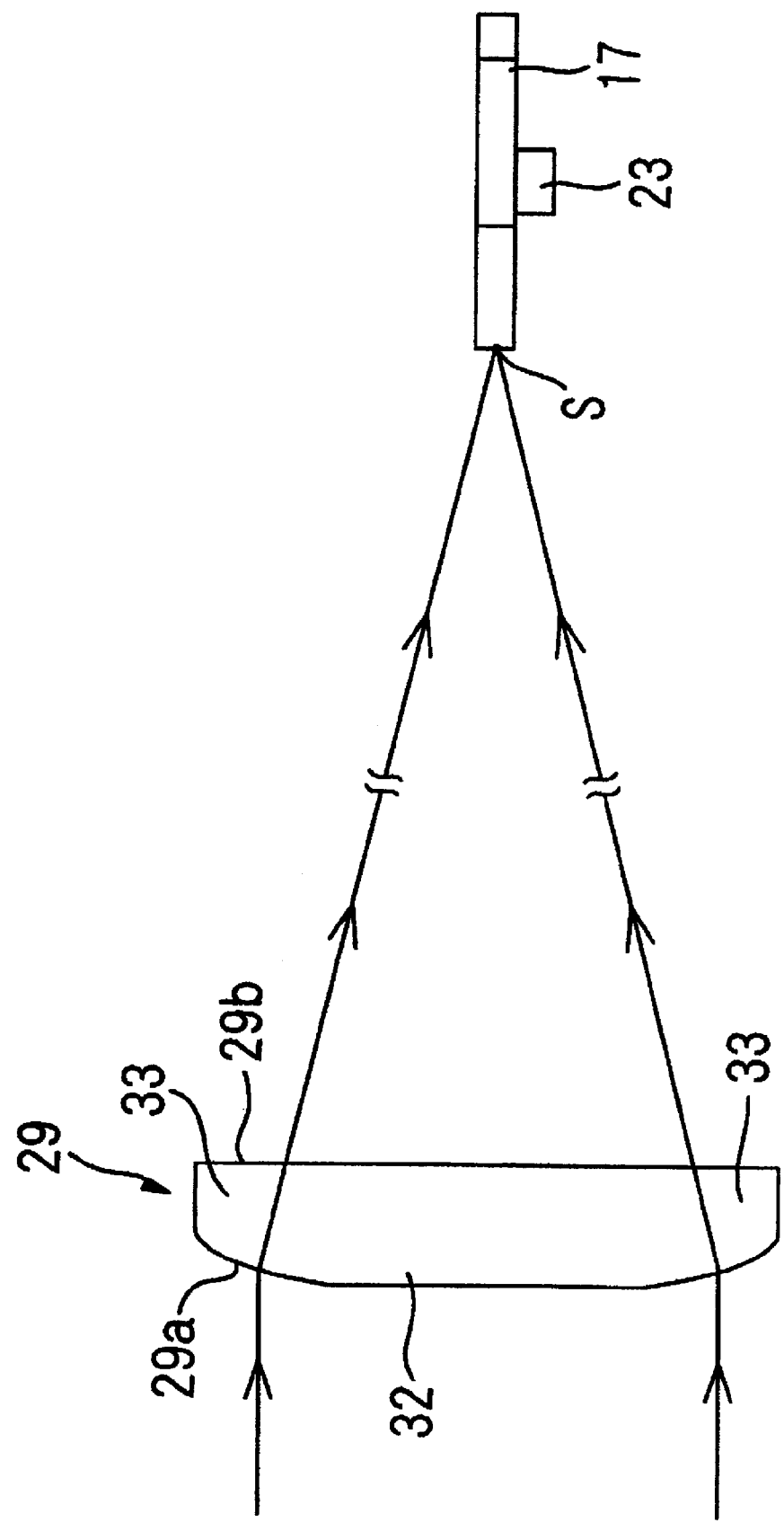
FIG. 5 is a side view of a cylindrical lens, seen from a side, in the light beam irradiating optical unit shown in FIG. 4.

FIG. 5 is a side view of the cylindrical lens 29 seen from a side (the horizontal direction orthogonal to the light beam passing direction). As shown in FIG. 5, the cylindrical lens 29 has a thin portion 32 where the thickness between the entrance plane 29a and the emission plane 29b is reduced by forming the entrance plane 29a in a shape created by cutting off a surface top part from a surface shape having a convex cross section, and has light converging portions 33 on both sides of the thin portion 32 in the sub-scanning direction Y (see FIG. 4) on which the light beams passed through the second slit plate 28 are incident.

More specifically, the entrance plane 29a of the cylindrical lens 29 is formed in a shape created by cutting off the surface top part over the entire width in the main scanning direction X (see FIG. 4) of the cylindrical lens 29 from the shape having a convex cross section capable of converging light beams incident on the whole area on one point. Thus, the center portion of the entrance plane 29a in the sub-scanning direction is made a flat surface, and the cylindrical lens 29 has the thin portion 32 between the flat surface and the emission plane 29b, and the light converging portions 33 on both sides of the thin portion 32 in the sub-scanning direction Y.

Further, since the thin portion 32 is made thin, it has a different focal length from the light converging portions 33.

Each of the light converging portions 33 has a refracting power only in the sub-scanning direction Y, refracts each light beam in the sub-scanning direction Y, and converges the light beam on a focal point S on the deflecting plane 17a of the polygon mirror 17 after emitted from the emission plane 29b.

In other words, the cylindrical lens 29 has light converging portions 33 for converging the light beams passed through the second slit plate 28 on the focal point S on the deflecting plane 17a of the polygon mirror 17, and the thin portion 32 whose thickness between the entrance plane 29a and the emission plane 29b (thickness in the passing direction of the light beam when incident on the light converging portion 33) is not more than the maximum thickness between the entrance plane 29a and the emission plane 29b in the light converging portion 33 and whose focal length differs from the light converging portions 33.

Further, as shown in FIG. 3, the two light beam irradiating optical units 18 are disposed symmetrically on mutually opposite sides with respect to the polygon mirror 17, and two light beams passed through the cylindrical lenses 29 of the respective light beam irradiating optical units 18 are incident on the polygon mirror 17 from the mutually opposite sides. Thus, four light beams are incident in pairs on the polygon mirror 17 from mutually opposite sides.

The polygon mirror 17 deflects the two pairs of light beams (four light beams) incident from mutually opposite sides with high speed rotation, and scans the light beams in the main scanning direction X. Since the two light beams of each pair are incident on the reflective plane of the polygon mirror 17 at mutually different angles, they are reflected from the deflecting plane 17a at angles so that they are gradually separated form each other in the sub-scanning direction Y (top-to-bottom direction).

Two fθ lenses 19 are provided for the two pairs of light beams so that they face each other with the polygon mirror 17 therebetween in a direction orthogonal to a direction in which each pair of light beams are incident on the polygon mirror 17.

Each of the fθ lenses 19 converts two light beams incident on the polygon mirror 17 from each of the light beam irradiating optical units 18 and scanned in the main scanning direction X by the polygon mirror 17 into parallel light beams of equal speed.

As shown in FIG. 6, a light beam emitting optical unit 20 is provided for each color. In other words, the light beam emitting optical units 20 include four yellow optical unit 20Y, magenta optical unit 20M, cyan optical unit 20C, and black optical unit 20K corresponding to the respective colors.

The yellow optical unit 20Y is disposed in the front most position in the front-to-rear direction, and comprises two reflective mirrors 35a and 35b for reflecting the light beam passed through the upper part of one fθ lens 19, and a toroidal lens 36 for converging the light beam reflected by the reflective mirrors 35a and 35b in the sub-scanning direction Y.

The light beam passed through the upper part of the one fθ lens 19 is first reflected obliquely in an upper rear direction by the reflective mirror 35a in the yellow optical unit 20Y, and then reflected vertically downward by the reflective mirror 35b. Thereafter, the light beam vertically passes through the toroidal lens 36, and is then emitted from a yellow emission window 21Y.

The magenta optical unit 20M is disposed between the polygon mirror 17 and the yellow optical unit 20Y, and comprises three reflective mirrors 37a, 37b and 37c for reflecting the light beam passed through the lower part of the one fθ lens 19, and a toroidal lens 38 for converging the light beam reflected by the reflective mirrors 37a, 37b and 37c in the sub-scanning direction Y.

The light beam passed through the lower part of the one fθ lens 19 is first reflected upward by the reflective mirror 37a in the magenta optical unit 20M, and then reflected to the rear side by the reflective mirror 37b. Thereafter, the light beam is reflected vertically downward by the reflective mirror 37c, passes vertically through the toroidal lens 38, and is then emitted from a magenta emission window 21M.

The cyan optical unit 20C is disposed between the polygon mirror 17 and the black optical unit 20K, and comprises three reflective mirrors 39*a*, 39*b* and 39*c* for reflecting the light beam passed through the lower part of the other lens fθ 19, and a toroidal lens 40 for converging the light beam reflected by the reflective mirrors 39*a*, 39*b* and 39*c* in the sub-scanning direction Y.

The light beam passed through the lower part of the other fθ lens 19 is first reflected upward by the reflective mirror 39*a* in the cyan optical unit 20C, and then reflected to the front side by the reflective mirror 39*b*. Thereafter, the light beam is reflected vertically downward by the reflective mirror 39*c*, passes vertically through the toroidal lens 40, and is then emitted from a cyan emission window 21C.

The black optical unit 20K is disposed in the rear most position in the front-to-rear direction, and comprises two reflective mirrors 41*a* and 41*b* for reflecting the light beam passed through the upper part of the other lens fθ 19, and a toroidal lens 42 for converging the light beam reflected by the reflective mirror 41*a* and 41*b* in the sub-scanning direction Y.

The light beam passed through the upper part of the other fθ lens 19 is first reflected obliquely in an upper front direction by the reflective mirror 41*a* in the black optical unit 20K, and then reflected vertically downward by the reflective mirror 41*b*. Thereafter, the light beam vertically passes through the toroidal lens 42, and is then emitted from a black emission window 21K.

Note that the magenta optical unit 20M and the cyan optical unit 20C are arranged symmetrically about the polygon mirror 17, and the yellow optical unit 20Y and the black optical unit 20K are positioned outside the magenta optical unit 20M and the cyan optical unit 20C symmetrically about the polygon mirror 17.

<Structure of Processing Unit>

As shown in FIG. 1, a plurality of processing units 13 are provided corresponding to toners in a plurality of colors. In other words, the processing units 13 consist of four yellow processing unit 13Y, magenta processing unit 13M, cyan processing unit 13C and black processing unit 13K. These processing units 13 are arranged sequentially from the front to rear side with a space therebetween to overlap in a horizontal direction.

Each of the processing units 13 comprises a photoconductor drum 51 as a photoconductor, a scorotron charger 52, and a development cartridge 53 as developer supply means.

The photoconductor drum 51 is in a cylindrical form, and comprises a drum body whose outermost layer is formed by a positive-charge-type photosensitive layer made from polycarbonate or the like, and a drum shaft extending along the axial direction of the drum body at the axial center of the drum body. The drum body is rotatably mounted on the drum shaft, and the drum shaft is supported by both side walls in the width direction of the processing unit 13 (the direction crossing the front-to-rear direction and the top-to-bottom direction at right angles, the same is also said for the following description) so that it is not rotatable. The photoconductor drum 51 is driven to rotate in the same direction (clockwise in FIG. 1) as the moving direction of a later-described transport belt 61 at the contact position with the transport belt 61 when forming an image.

The scorotron charger 52 is a positive-charge-type scorotron charger comprising a wire and a grid for producing a corona discharge with an application of a charging bias, and is disposed on the rear side of the photoconductor drum 51 to face the photoconductor drum 51 with a space therebetween so that it is not in contact with the photoconductor drum 51.

The development cartridge 53 comprises a development roller 56, a supply roller 57, and a layer thickness control blade 58 in its body.

The development roller 56 is disposed in front of the photoconductor drum 51 to face the photoconductor drum 51, and is pressed against the photoconductor drum 51. The development roller 56 comprises a metal roller shaft covered with a roller part made of an elastic member such as a conductive rubber material. More specifically, the roller part is formed in a two-layer structure including a roller layer made of an elastic material such as a conductive urethane rubber, silicone rubber or EPDM rubber containing carbon fine particles, and a coat layer composed mainly of a urethane rubber, urethane resin, polyimide resin, etc., and covering the surface of the roller layer. The roller shaft of the development roller 56 is rotatably supported by both side walls in the width direction of the processing unit 13, and a development bias is applied when forming an image.

The supply roller 57 is disposed in front of the development roller 56 to face the development roller 56, and is pressed against the development roller 56. The supply roller 57 comprises a metal roller shaft covered with a roller part made of a conductive sponge member. The roller shaft of the supply roller 57 is rotatably supported by both side walls in the width direction of the processing unit 13.

The layer thickness control blade 58 is made of a metallic plate spring material, and has on its tip a pressing member with a semicircular cross section made of an insulating silicone rubber. The layer thickness control blade 58 is supported above the development roller 56 by the body of the development cartridge 53, and the pressing member on its tip (lower end) is pressed from an upper front direction against the development roller 56.

The upper part of the body of the development cartridge 53 is formed as a toner holding chamber 55 for holding toner, and holds toner of each color. Specifically, a positive-charge-type non-magnetic one-component polymerized toner in yellow color is held in the toner holding chamber 55 of the yellow processing unit 13Y. A positive-charge-type non-magnetic one-component polymerized toner in magenta color is held in the toner holding chamber 55 of the magenta processing unit 13M. A positive-charge-type non-magnetic one-component polymerized toner in cyan color is held in the toner holding chamber 55 of the cyan processing unit 13C. A positive-charge-type non-magnetic one-component polymerized toner in black color is held in the toner holding chamber 55 of the black processing unit 13K.

More specifically, for the toner in each color, substantially spherical polymerized toner obtained by a polymerization method is used. The polymerized toner is produced by using, as a main component, a binding resin obtained by copolymerizing styrene-based monomer such as styrene and acryl-based monomer such as acrylic acid, alkyl (C1-C4) acrylate and alkyl (C1-C4) methacrylate by a known polymerization method such as suspension polymerization, mixing a coloring agent, charge control agent, wax, etc. with the binding resin to form toner mother particles, and further adding an addition agent to the toner mother particles to improve the fluidity.

As the coloring agents, coloring agents in the above-described yellow, magenta, cyan and black are mixed. Further, as the charge control agent, for example, a charge control resin obtained by copolymerizing an ionic monomer having an ionic functional group such as an ammonium salt and a monomer copolymerizable with the ionic monomer, such as a styrene-based monomer and acryl-based monomer, is mixed. As the addition agent, for example, a powder of metal oxide, such as silica, aluminum oxide, titanium oxide, strontium titanate, cerium oxide and magnesium oxide, or an inorganic powder, such as a powder of carbide and a powder of metallic salt, is mixed.

In each of the processing units 13, when forming an image, the toner in each color held in each of the toner holding chambers 55 is supplied to the supply roller 57 and supplied to the development roller 56 with a rotation of the supply roller 57. At this time, the toner is frictionally charged positive between the supply roller 57 and the development roller 56 to which the development bias is applied. The toner supplied on the development roller 56 enters the space between the layer thickness control blade 58 and the development roller 56 with a rotation of the development roller 56, and is carried as a thin layer with a uniform thickness on the development roller 56.

Meanwhile, the scorotron charger 52 produces a corona discharge by the application of the charging bias, and uniformly charges the surface of the photoconductor drum 51 positive. After the surface of the photoconductor drum 51 is uniformly charged positive by the scorotron charger 52 with a rotation of the photoconductor drum 51, it is exposed to light by high-speed scan of the light beam emitted from the emission window 21 of the scanner unit 12, and an electrostatic latent image in each color corresponding to an image to be formed on the paper 3 is formed on the surface of the photoconductor drum 51.

Further, the photoconductor drum 51 is rotated, and then the toner carried on the surface of the development roller 56 and charged positive is supplied to the electrostatic latent image formed on the surface of the photoconductor drum 51, that is, the exposed portion where the electric potential is decreased by the exposure to the light beam in the surface of the photoconductor drum 51 uniformly charged positive, when the toner faces and comes into contact with the photoconductor drum 51 with a rotation of the development roller 56. Consequently, the electrostatic latent image on the photoconductor drum 51 is visualized, and the toner image formed by reverse development corresponding to each color is carried on the surface of the photoconductor drum 51.

<Structure of Transfer Unit>

The transfer unit 14 is disposed along the front-to-rear direction in the main casing 2 at a position above the paper cassette 7 and under the processing unit 13. The transfer unit 14 comprises a driving roller 59, a driven roller 60, a transport belt 61, transfer rollers 62, and a belt cleaning unit 63.

The driving roller 59 is disposed on the lower rear side of the photoconductor drum 51 of the black processing unit 13K. The driving roller 59 is driven to rotate in the reverse direction (counterclockwise in FIG. 1) to the rotating direction of the photoconductor drum 51 when forming an image.

The driven roller 60 is disposed on the lower front side of the photoconductor drum 51 of the yellow processing unit 13Y to face the driving roller 59 in the front-to-rear direction. The driven roller 60 is rotated in the same direction (counterclockwise in FIG. 1) as the rotating direction of the driving roller 59 when the driving roller 59 is driven to rotate.

The transport belt 61 is composed of an endless belt formed by a resin, such as conductive polycarbonate or polyimide, in which conductive particles such as carbon are dispersed. The transport belt 61 is wound between the driving roller 59 and the driven roller 60, and arranged so that the outer contact surface of the wound transport belt 61 faces and is in contact with all the photoconductor drums 51 of the respective processing units 13.

With the driving of the driving roller 59, the driven roller 60 is driven, and the transport belt 61 is moved round in a direction shown by arrow A (counterclockwise in FIG. 1) between the driving roller 59 and the driven roller 60 so that it rotates in the same direction as the photoconductor drum 51 on the contact surface facing and in contact with the photoconductor drums 51 of the respective processing units 13.

The transfer rollers 62 are disposed inside the transport belt 61 wound between the driving roller 59 and the driven roller 60 so that they face the photoconductor drums 51 of the respective processing units 13 with the transport belt 61 therebetween. Each of the transfer rollers 62 comprises a metal roller shaft covered with a roller part made of an elastic member such as a conductive rubber material. The roller shaft of the transfer roller 62 extends along the width direction and is rotatably supported, and a transfer bias is applied to the transfer roller 62 during a transfer. Each transfer roller 62 rotates in the same direction (counterclockwise in FIG. 1) as the moving direction of the transport belt 61 on the contact surface facing and in contact with the transport belt 61.

Then, the paper 3 fed from the paper feed unit 4 is transported to pass through the image forming positions between the transport belt 61 and the photoconductor drums 51 of the respective processing units 13 one after the other from the front toward the rear side by the transport belt 61 that is moved by the driving of the driving roller 59 and the following movement of the driven roller 60. During the transport, the toner images corresponding to the respective colors carried on the photoconductor drums 51 of the respective processing units 13 are transferred one after the other, and consequently, a color image is formed on the paper 3.

In other words, for example, when the yellow toner image carried on the surface of the photoconductor drum 51 of the yellow processing unit 13Y is transferred to the paper 3, then the magenta toner image carried on the surface of the photoconductor drum 51 of the magenta processing unit 13M is transferred in a superimposed manner to the paper 3 on which the yellow toner image has already been transferred. Similarly, the cyan toner image carried on the surface of the photoconductor drum 51 of the cyan processing unit 13C and the black toner image carried on the surface of the photoconductor drum 51 of the black processing unit 13K are transferred in a superimposed manner, and consequently a color image is formed on the paper 3.

When forming such a color image, the color laser printer 1 can form toner images corresponding to the respective colors at substantially the same speed as a speed of forming a monochrome image because it has a tandem type apparatus structure in which a plurality of processing units 13 are provided corresponding to the respective colors, thereby achieving quick color image formation. It is thus possible to form a color image while achieving size reduction.

The belt cleaning unit 63 is disposed under the transport belt 61 to face the black processing unit 13K with the transport belt 61 therebetween.

The belt cleaning unit 63 is arranged in contact with the surface of the transport belt 61, and comprises a primary cleaning roller 64 for scraping off the paper powder and toner adhering to the surface of the transport belt 61; a secondary cleaning roller 65 disposed in contact with the primary cleaning roller 64 to electrically collect the paper powder and toner scraped off by the primary cleaning roller 64; a scraping blade 66 that comes into contact with the secondary cleaning roller 65 and scrapes off the paper powder and toner collected on the secondary cleaning roller 65; and a cleaning box 67 for storing the paper powder and toner scraped off by the scraping blade 66.

In the belt cleaning unit 63, the paper powder and toner adhering to the surface of the transport belt 61 are first scraped off by the primary cleaning roller 64, and then the paper powder and toner scraped off by the primary cleaning roller 64 are electrically collected by the secondary cleaning roller 65. Next, after the paper powder and toner collected by the secondary cleaning roller 65 are scraped off by the scraping blade 66, they are stored in the cleaning box 67.

<Structure of Fixing Unit>

The fixing unit 15 is disposed on the rear side of the transfer unit 14. The fixing unit 15 comprises a heat roller 68, a pressure roller 69, and transport rollers 70. The heat roller 68 is composed of a metal pipe with a surface on which a mold release layer is formed, and incorporates a halogen lamp along the axial direction. The surface of the heat roller 68 is heated to a fixing temperature by the halogen lamp. The pressure roller 69 is mounted to press the heat roller 68. The transport rollers 70 consist of a pair of upper and lower rollers, and are disposed on the rear side of the heat roller 68 and the pressure roller 69.

The color image transferred onto the paper 3 is next transported to the fixing unit 15, and thermally fixed to the paper 3 by heat and pressure while the paper 3 is passing between the heat roller 68 and the pressure roller 69. The thermally fixed paper 3 is transported to the paper discharge unit 6 by the transport rollers <Structure of Paper Discharge Unit>

The paper discharge unit 6 comprises a paper discharge path 71, a paper discharge roller 72, and a paper discharge tray 73.

The paper discharge path 71 is formed as a substantially U-shaped transport path for paper 3 so that the upstream-side end is adjacent to the transport rollers 70 on the lower side to feed the paper 3 toward the rear side, and that the downstream-side end is adjacent to the paper discharge rollers 72 on the upper side to discharge the paper 3 toward the front side.

The paper discharge rollers 72 are provided as a pair of rollers on the downstream-side end of the paper discharge path 71.

The paper discharge tray 73 is formed on the upper surface of the main casing 2 as an inclined wall inclining downward from the front to rear side.

After the transport direction of the paper 3 fed from the transport rollers 70 is reversed in the paper discharge path 71, the paper 3 is discharged toward the front side by the paper discharge rollers 72. The discharged paper 3 is placed on the paper discharge tray 73.

As described above, in the scanner unit 12 of the color laser printer 1, four light beam emitting units 24 are arranged in pairs symmetrically with respect to the polygon mirror 17, and one cylindrical lens 29 is provided for each pair. Since the cylindrical lens 29 has the thin portion 32, if the cylindrical lens 29 is formed by injection molding using a resin material, it is possible to reduce the time required for cooling and solidifying the resin. It is therefore possible to shorten the manufacturing time of the cylindrical lens 29. As a result, the productivity of the scanner apparatus 12 can be improved, and consequently the productivity of the color laser printer 1 can be improved.

In the cylindrical lens 29, the entrance plane 29a is formed in a shape created by cutting off the surface top part over the entire width in the main scanning direction X (see FIG. 4) of the cylindrical lens 29 from a shape having a convex cross section capable of converging light beams incident on the whole area on one point, and the portion between the flat surface at the center of the entrance plane 29a in the sub-scanning direction and the emission plane 29b is made the thin portion 32. Therefore, the cylindrical lens 29 having the thin portion 32 can be easily manufactured by refining the mold for manufacturing a conventional cylindrical lens.

Moreover, the thin portion 32 can be formed easily because its surface forming a part of the entrance plane 29a is made a flat surface orthogonal to the passing direction when the light beam is incident and does not have a complicated surface configuration. It is therefore possible to further reduce the manufacturing time of the cylindrical lens 29. As a result, the productivity of the scanner apparatus 12 can be improved, and consequently the productivity of the color laser printer 1 can be improved.

In addition, the cylindrical lens 29 has the light converging portions 33 on both sides of the thin portion 32 in the sub-scanning direction, and two light beams emitted from two light beam emitting units 24 of each pair sequentially pass through or reflected by the collimator lenses 25, the first slit plate 26, the reflective mirror 27 and the second slit plate 28, and are then aligned in the sub-scanning direction Y and incident on the light converging portions 33, respectively. The cylindrical lens 29 focuses these light beams by converging them on the deflecting plane 17a of the polygon mirror 17. Therefore, even though the cylindrical lens 29 has the thin portion 32, it is possible to accurately converge (focus) light beams on the deflecting plane 17a of the polygon mirror 17 without causing problems, such as a focal displacement of the light beams with respect to the deflecting plane 17a of the polygon mirror 17.

Moreover, since two light beams are incident on both sides, respectively, of the thin portion 32 of the cylindrical lens 29, it is possible to accurately converge the two light beams on the deflecting plane 17a of the polygon mirror 17 while ensuring a well balanced layout in the scanner unit 12.

Further, since two light beams are incident on the cylindrical lens 29 while being aligned in the sub-scanning direction Y, it is possible to more accurately converge these light beams on the deflecting plane 17a of the polygon mirror 17 while preventing the two light beams from interfering with each other.

Moreover, since the second slit plate 28 is provided on the upstream side of the cylindrical lens 29 in the light beam passing direction, it is possible to prevent the incidence of light beams on the thin portion 32 of the cylindrical lens 29. It is thus possible to certainly prevent occurrence of problems, such as a focal displacement of the light beams with respect to the deflecting plane 17a of the polygon mirror 17. As a result, the light beams can be more accurately converged on the deflecting plane 17a of the polygon mirror 17.

Further, two light beams from each of the pairs of light beam emitting units 24 arranged in pairs symmetrically with respect to the polygon mirror 17 are incident on the polygon mirror 17 from directions symmetrical to each other. Therefore, the respective light beams can be accurately converged on the deflecting plane 17a of the polygon mirror 17 while achieving a well balanced layout.

In addition, two light beams of each of the pairs (four light beams) deflected and scanned by the polygon mirror 17 pass through the fθ lenses 19 and converted into light beams of equal speed on an image surface, and then emitted from different emission windows 21 by the respective light beam emission optical units 20. In the color laser printer 1, four processing units 13 are provided corresponding to the light beams emitted from the four emission windows 21 of the scanner unit 12, and an electrostatic latent image is formed on each of the four photoconductor drums 51 in the respective processing units 13 by irradiating an independent light beam on each of the photoconductor drums 51. It is therefore possible to form electrostatic latent images on four photoconductor drums 51 by one scanner unit 12. As a result, the size of the color laser printer 1 can be reduced compared with a structure in which a scanner unit is provided for each of the photoconductor drums 51.

Next, the four electrostatic latent images formed on the four photoconductor drums 51 are developed using developers corresponding to yellow, magenta, cyan, and black, respectively, by the four development rollers 56 in the respective processing units 13, and then superimposed one after the other on the same paper 3 in the transfer unit 14.

Thus, with the color laser printer 1, it is possible to form a an accurate color image by forming accurate electrostatic latent images on the respective photoconductor drums 51, and it is also possible to form the color image at substantially the same speed as a monochrome image.

<Other Structure of Cylindrical Lens>

Figure 7:
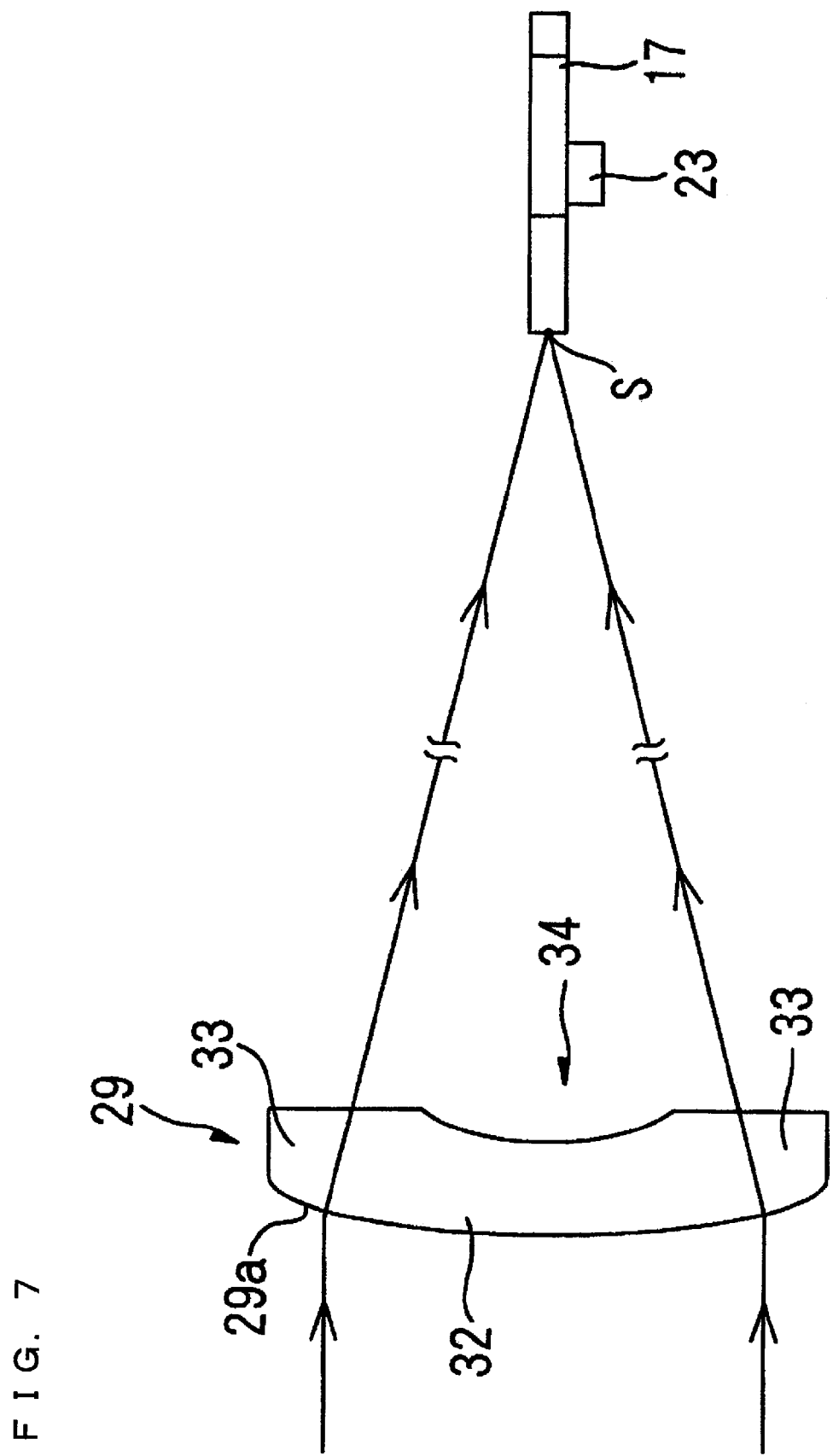
FIG. 7 is a side view showing another embodiment of the cylindrical lens shown in FIG. 5 (a mode in which a concave unit is formed in an emission plane).

FIG. 7 is a side view illustrating another embodiment of the cylindrical lens 29 shown in FIG. 5. In FIG. 7, units corresponding to the respective units shown in FIG. 5 are designated with the same reference codes as in FIG. 5. FIG. 7 is a side view seen from the same direction as FIG. 5.

In the cylindrical lens 29 shown in FIG. 7, the entrance plane 29a is formed as a surface having a convex cross section, and a concave unit 34 with a concave cross section is formed in a part of the emission plane 29b facing the surface top part of the entrance plane 29a over the entire width in the main scanning direction X (see FIG. 4). Hence, the cylindrical lens 29 has a thin portion 32 where the thickness between the entrance plane 29a and the emission plane 29b is reduced, and light converging portions 33 on both sides of the thin portion 32 in the sub-scanning direction Y (see FIG. 4).

In such a structure, since the cylindrical lens 29 also has the thin portion 32, if the cylindrical lens 29 is formed by injection molding using a resin material, it is possible to reduce the time required for cooling and solidifying the resin. It is therefore possible to shorten the manufacturing time of the cylindrical lens 29. As a result, the productivity of the scanner apparatus 12 can be improved, and consequently the productivity of the color laser printer 1 can be improved.

MODIFIED EXAMPLE

In the above explanation, although two light beam irradiating optical units 18, each including a pair of light beam emitting units 24, are arranged symmetrically with respect to the polygon mirror 17, the arrangement of the light beam emitting units 24, etc. are not particularly limited, and, for example, it may be possible to dispose one light beam irradiating optical unit 18 including four light beam emitting units 24 as one set on one side of the polygon mirror 17. In this case, one cylindrical lens 29 may be provided for two light beam emitting units 24, or one cylindrical lens 29 may be provided for four light beam emitting units 24. Further, in the case where one cylindrical lens 29 is provided for four light beam emitting units 24, it is preferable to arrange the four light beam emitting units 24 and the cylindrical lens 29 so that two light beams are aligned in the sub-scanning direction Y and incident on the respective light converging portions 33 of the cylindrical lens 29.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A scanner apparatus comprising:
   a light beam emitting unit for emitting a light beam;
   a lens having a thin portion where a thickness between an entrance plane side and an emission plane side is reduced by a concave unit in a part of the emission plane side facing a surface top part of the entrance plane side having a convex cross section, for converging a light beam incident on a portion other than the thin portion from said light beam emitting unit on a single focal point after emitted from the emission plane side; and
   a deflecting unit having a deflecting plane for reflecting and deflecting the light beam from said lens, for scanning the light beam in one scanning direction.

2. The scanner apparatus according to claim 1, wherein a plurality of said light beam emitting units are provided.

3. The scanner apparatus according to claim 2, wherein an equal number of light beams are incident on both sides of the thin portion of said lens.

4. The scanner apparatus according to claim 3, wherein the thin portion is formed to extend in one scanning direction, and
   a plurality of light beams are aligned in other scanning direction crossing the one scanning direction and incident on said lens.

5. The scanner apparatus according to claim 2, wherein a plurality of said light beam emitting units are arranged in pairs symmetrically with respect to said deflecting unit, and
   said lens is a cylindrical lens for converging two light beams of each pair on a single focal point on the deflecting plane, one cylindrical lens being provided for each pair.

6. The scanner apparatus according to claim 5, further comprising:
   fθ lenses for converting respective pairs of light beams into light beams of equal speed on an image surface, two fθ lenses being provided corresponding to the respective pairs of light beams emitted from the respective pairs of said light beam emitting units and scanned by said deflecting unit; and
   optical path forming units for emitting the light beams passed through said fθ lenses from different positions with a space therebetween.

7. The scanner apparatus according to claim 1, wherein a surface of the thin portion, which forms a part of the entrance plane, is made a flat surface orthogonal to a passing direction of the light beam when incident on the entrance plane.

8. The scanner apparatus according to claim 1, further comprising a slit member, disposed on an upstream side of said lens in a passing direction of the light beam, for preventing incidence of the light beam on the thin portion.

9. An image forming apparatus comprising:

a photoconductor;

a light beam emitting unit for emitting a light beam to expose said photoconductor to light;

a lens having a thin portion where a thickness between an entrance plane side and an emission plane side is reduced by a concave unit in a part of the emission plane side facing a surface top part of the entrance plane side having a convex cross section, for converging a light beam incident on a portion other than the thin portion from said light beam emitting unit on a single focal point after emitted from the emission plane side; and a deflecting unit having a deflecting plane for reflecting and deflecting the light beam from said lens, for scanning the light beam in one scanning direction on said photoconductor.

10. The image forming apparatus according to claim 9, wherein four photoconductors are provided, four light beam emitting units are provided corresponding to said photoconductors, respectively, and arranged in pairs symmetrically with respect to said deflecting unit, and the image forming apparatus further comprises:

fθ lenses for converting respective pairs of light beams into light beams of equal speed on an image surface, two fθ lenses being provided corresponding to the respective pairs of light beams emitted from the respective pairs of said light beam emitting units and scanned by said deflecting unit; and optical path forming units for guiding the light beams passed through said fθ lenses to the corresponding photoconductors, respectively.

11. The image forming apparatus according to claim 10, further comprising four developer supply units, provided corresponding to said photoconductors, respectively, for supplying developers in different colors to the respective photoconductors.

* * * * *